(12) United States Patent
Zimmermann et al.

(10) Patent No.: US 12,010,116 B2
(45) Date of Patent: *Jun. 11, 2024

(54) SECURE ACCESS OF REMOTE DEVICE (71) Applicant: ZPE Systems, Inc., Fremont, CA (US)

(72) Inventors: Arnaldo Zimmermann, Dublin, CA (US); Livio Ceci, Fremont, CA (US)

(73) Assignee: ZPE SYSTEMS, INC., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,320

(22) Filed: May 19, 2023

(65) Prior Publication Data

US 2023/0291734 A1 Sep. 14, 2023

Related U.S. Application Data

(63) Continuation of application No. 17/111,443, filed on Dec. 3, 2020, now Pat. No. 11,695,761.

(51) Int. Cl.
*H04L 9/40* (2022.01)
(52) U.S. Cl.
CPC ...... *H04L 63/0869* (2013.01); *H04L 63/0823* (2013.01)

(58) Field of Classification Search
CPC .............. H04L 63/0869; H04L 63/0823
See application file for complete search history.

(56) References Cited

U.S. PATENT DOCUMENTS

| | | | |
|---|---|---|---|
| 2017/0005999 A1* | 1/2017 | Choyi | H04W 12/08 |
| 2018/0181756 A1* | 6/2018 | Campagna | H04L 9/088 |
| 2018/0212904 A1* | 7/2018 | Smullen | H04L 51/04 |
| 2018/0238570 A1* | 8/2018 | McCarthy | F24F 13/28 |

* cited by examiner

*Primary Examiner* — Abiy Getachew
(74) *Attorney, Agent, or Firm* — HORIZON IP PTE. LTD.

(57) ABSTRACT

A cloud-based communication framework. A first secure channel may be established for communication between an IT device and a cloud-computing platform. A request for a device user interface may be received over the first secure channel. A second secure channel for communication between the IT device and the cloud-computing platform may be established in response to the request for the device user interface. The device user interface may then be forwarded over the second secure channel to the cloud-computing platform.

20 Claims, 5 Drawing Sheets

CLOUD MANAGEMENT SYSTEM

DASHBOARD　SITES　GROUPS　DEVICES　USERS　PROFILES　SETTINGS

ENROLLED　AVAILABLE

| Hostname | Serial Number | Model | Status | Site Name | Version | Uptime | Revision Tag | Backup Time | Access |
|---|---|---|---|---|---|---|---|---|---|
| ☐ HostA | 1234 | NB-SR | Online | Headquarters | V4.2 | 45 days 5 h 22 min | r1 | - | Connect |
| ☐ HostB | 5346 | NB-SR | Offline | Brazil | V1.3 | 1 day 1 h 30 min | r3 | - | Connect |

Rows per page: 10　　1-2 of 2 < >

SECURE ACCESS OF REMOTE DEVICE

CROSS-REFERENCE TO RELATED APPLICATIONS

This application is a continuation of prior application Ser. No. 17/111,443, filed Dec. 3, 2020 entitled "Secure Access of Remote Device," which is a continuation-in-part of prior application Ser. No. 16/891,012, filed Jun. 2, 2020, entitled "Cloud-based communication system," which claims the benefit of U.S. Provisional Application No. 62/856,756, filed Jun. 4, 2019, which are hereby incorporated by reference in its entirety. This application further claims the benefit of U.S. Provisional Application No. 62/943,753, filed Dec. 4, 2019, which is hereby incorporated by reference in its entirety.

BACKGROUND

As an organization expands, there is an increasing need to purchase, deploy, and/or maintain devices (e.g., routers, serial consoles, data center devices, networking devices) at each head office and at each branch office of the organization. With an expanding network of devices, it becomes increasingly difficult to configure, monitor and manage the devices remotely.

Typically, deploying a branch network involves sending a lot of equipment and personnel to the satellite or remote location. This can be quite a monumental undertaking, because there are many pieces to set into motion. First, the location's networking needs have to be defined. A plan is then developed to set up the devices or equipment appropriately. When ready, stacks of equipment need to be shipped to the remote location, which can involve plenty of time and money, especially if the remote site is isolated.

Once all devices and personnel are on-site, essential duties must be performed at the location. This includes not only the initial set-up, but also ongoing maintenance and management. Installing, configuring and provisioning the branch network requires staff to connect to each device. Using the command line interface (CLI) and other tools, they need to perform the tedious tasks to manually configure every component in the stack. The same goes for troubleshooting issues and managing the branch. If a critical issue arises, an outage occurs, or a change must be made, staff needs to be sent on-site. To keep the branch running, physical presence of staff members typically needs to be maintained at or near the location, which pulls them away from other critical business duties.

Accordingly, deploying one branch network can be challenging. Such challenges grow enormously with even more locations. This makes scaling the business very difficult and resource-intensive.

DETAILED DESCRIPTION

In the following detailed description of embodiments of the invention, numerous specific features are set forth in order to provide a thorough understanding of the embodiment of the invention. However, it will be obvious to a person skilled in the art that the embodiments of the invention may be practiced with or without these specific details. In other instances, well known methods, procedures and components have not been described in detail, so as not to unnecessarily obscure aspects of the embodiments of the invention.

A "device" as used herein is a machine and/or component that may attach to a computer and/or computer network. Examples of devices include disk drives, printers, displays, mice, and modems. These particular devices may fall into a category of peripheral devices separate from a main computing device. Other examples of devices may be non-peripheral devices such as IT devices. Many devices, whether peripheral or not, may employ a program called a device driver that may act as a translator, converting general commands from an application into specific commands that the device understands.

An "IT device" is an "Information Technology" device related to computing technology, comprising, but not limited to: data center devices, networking devices, hardware devices, software operating in combination with a hardware IT device, Internet devices, and/or the like. Some IT devices may employ virtual devices operating on specially configured hardware. Additional examples of IT devices include infrastructure management devices, servers, compute nodes, routers, switches, load balancers, networking nodes, storage nodes, power nodes, cooling nodes, storage appliances, power appliances, cooling appliances, network appliances, virtual devices, virtual machines, system hardware with network access, hosted module within a system, combinations thereof, and/or the like.

A virtual device may employ a software virtual device driver operating on a hardware computing device configured to emulate hardware and/or other devices so that multiple applications may, for example, access hardware interrupt channels, hardware resources and memory without causing conflicts. Computer hardware may require communication and control processes for devices and/or hardware components to access each other in a controlled manner. These processes may be defined as device drivers, which may comprise code that an application may employ to access hardware and/or external software resources. Some examples of virtual devices may be configured for use in multitasking operating systems. In such an example, a device driver may be controlled by an operating system's virtual device driver manager and shared by applications running within that kernel. A virtual device driver may pass interrupt and memory requests through the kernel, which in turn may allocate resources as required.

Some of the various embodiments may communicate with virtual (in combination with configured hardware) and/or physical IT devices such as compute nodes, networking nodes, storage nodes, power nodes, cooling nodes, other IT devices, combinations thereof, and/or the like.

The present framework provides a cloud-based computing platform. In accordance with one aspect, the cloud-based computing platform may be used to provide secure, high performance and cost-efficient access to a device user interface of a remote Information Technology (IT) device from another computing device (user device). A service on the cloud-based computing platform may collaborate with a remote access agent on the remote IT device to enable secure access to its device user interface. The service on the cloud management system acts as a proxy for the device user interface and exchanges device user interface data from the remote IT device and input events from the user's device. Advantageously, the device user interface of the remote IT device may be securely accessed and presented without opening a firewall at the remote IT device.

In accordance with another aspect, a remote IT device is managed via the cloud-based computing platform. The remote IT device may communicate with the cloud-based computing platform using one or more secure channels. The one or more secure channels may be established by mutual authentication using a trust certificate. The trust certificate may be generated with keys using the IT device's embedded secure cryptoprocessor.

In accordance with another aspect, the user device provides a user interface (e.g., web browser) to connect with the cloud-based computing platform. After authentication, the user device is provided a uniform resource locator (URL) that is unique to each remote IT device for accessing the device user interface of that remote IT device via the user interface. The cloud-based computing platform may include a micro service that exchanges the device user interface and user input data with a remote access agent on the remote IT device. The cloud-based computing platform may also include a device management channel for communicating (e.g., exchanging commands and events) with the remote IT device. These and other exemplary features and advantages will be described in more details herein.

Figure 1:
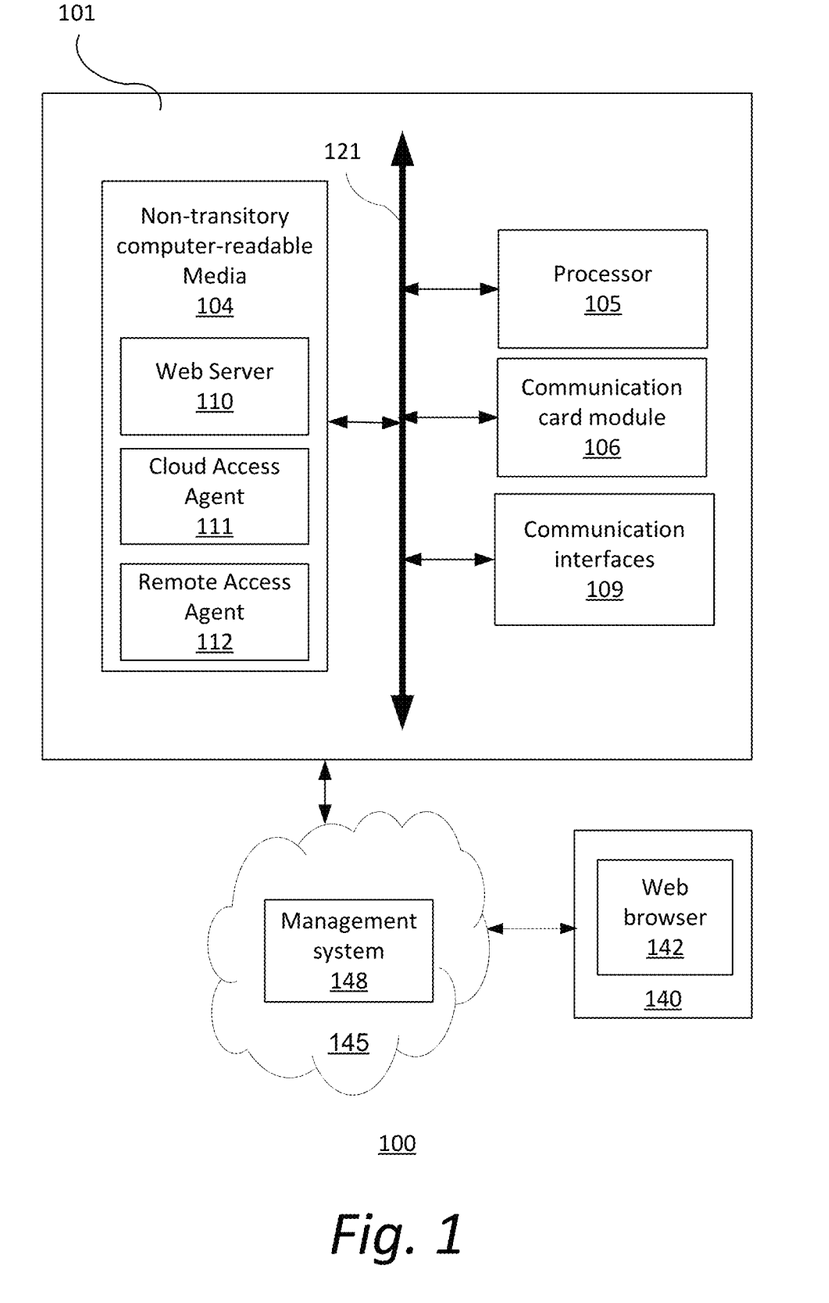
FIG. 1 illustrates an exemplary cloud-based communication system.

FIG. 1 illustrates an exemplary cloud-based communication system 100. The cloud-based communication system 100 includes an Information Technology (IT) device 101 communicatively coupled to a user device 140 via a cloud-computing platform 145. IT device 101 may be placed in a location (e.g., branch office) that is remote from user device 140. For example, IT device 101 and user device 140 may be located in different offices, cities, states or countries. In some implementations, IT device 101 includes one or more non-transitory tangible machine-readable media 104 coupled to one or more processors 105, communication card modules 106 and one or more communication interfaces 109 via an input-output interface 121. Other components may also be included. For example, support circuits such as a network switch, cache, a power supply, and a communications bus may also be included.

IT device 101 may be communicatively coupled to one or more other IT devices via one or more communication interfaces 109. IT device 101 may also comprise a multitude of IT devices configured to cooperatively operate together. In some implementations, IT device 101 is communicatively coupled to other IT devices over a network. The network may include, but is not limited to, the Internet, an intranet, a connection to the Internet, a private cloud, interconnected data centers, a multi-nodal network, two or more computing devices connected using a Virtual Private Network (VPN), an on-premise network, an RS-232 serial network, an RS-485 serial network, a Local Area Network (LAN), a Wide Area Network (WAN), a Wi-Fi wireless network, an USB port, a Bluetooth™, cellular network, a combination thereof, and/or the like.

One or more communication card modules 106 may be removably inserted or mounted in IT device 101 to provide desired functionalities. The desired functionalities may include, but are not limited to, one or more communication interfaces, network adapter (e.g., Local Area Network or LAN, Wide Area Network or WAN, Virtual Private Network or VPN, Wi-Fi, wireless WAN, Bluetooth™, cellular), storage (e.g., solid-state drive, dynamic random access memory, static random access memory, hard drive), cellular connectivity, satellite navigation, near field communication (NFC), digital radio, Wireless Gigabit Alliance (WiGig), power, compute functions, outlet functions, keyboard-video-mouse (KVM) switch, or a combination thereof. Communication card modules 106 may include the necessary logic for functioning according to a respective standard specification, such as the M.2 (or Next Generation Form Factor), mSATA, Personal Computer Memory Card International Association (PCMCIA), and so forth.

The one or more communication card modules 106 may provide one or more communication interfaces 109. The one or more communication interfaces 109 may include at least one of the following: one or more null-modem serial ports; one or more Data Communications Equipment (DCE) serial ports; one or more Data Terminal Equipment (DTE) serial ports; one or more Cisco pinout serial ports; one or more Cyclades pinout serial ports; one or more straight-through serial ports; one or more cross-over serial ports; one or more RJ45 ports; one or more RS-232 serial ports; one or more RS-485 serial ports; one or more universal serial bus (USB) ports; one or more serial ports; one or more Local Area Network (LAN) ports; one or more Wide Area Network (WAN) ports; one or more Wi-Fi wireless Network ports; one or more input-output (I/O) ports, one or more Ethernet ports (e.g., gigabit Ethernet or GbE ports, copper, Power over Ethernet or PoE+, small form factor pluggable or SFP+, etc.), cellular, a combination of the above and/or the like.

IT device 101 may provide networking processing, data routing and other capabilities. IT device 101 may include at least one of the following: system hardware with network access, a server, a compute node, a router, a switch, a load balancer, a networking node, a storage node, a power node, a network appliance, a virtual appliance, a hosted module within a system, a combination thereof, and/or the like. Other IT devices coupled to IT device 101 may include, for example, a server, a compute node, a router, a switch, a load balancer, a networking node, a storage node, a power node, a cooling node, a storage appliance, a power appliance, a cooling appliance, a network appliance, a virtual appliance, a virtual machine, system hardware with network access, a hosted module within a system, a combination thereof, and/or the like.

Non-transitory computer-readable media 104 is any available media that can be accessed by IT device 101 and includes both volatile and nonvolatile media, and removable and non-removable media. By way of example, and not limitation, computer-readable media 104 may include computer storage media. Computer storage media includes both volatile and nonvolatile, and removable and non-removable media implemented in any method or technology for storage of information such as computer-readable instructions, data structures, program modules or other data. Computer storage media includes, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by IT device 101.

User device 140 may include a computer system (e.g., workstation, mobile device) and appropriate peripherals, such as a keyboard and display device, and can be operated in conjunction with the entire system 100. For example, user device 140 may include one or more processors coupled to one or more non-transitory computer-readable media (e.g., computer storage or memory device), display device (e.g., monitor) and various input devices (e.g., mouse, touchpad or keyboard). In some implementations, user device 140 includes a web-browser 142 stored in the non-transitory computer-readable media, as will be described in more details herein.

In some implementations, user device 140 is communicatively coupled to other devices over a network. The network may comprise, but is not limited to: the Internet, an intranet, a connection to the Internet, a private cloud, interconnected data centers, a multi-nodal network, two or more computing devices connected using a Virtual Private Network (VPN), an on-premise network, an RS-232 serial network, an RS-485 serial network, a Local Area Network (LAN), a Wide Area Network (WAN), a Wi-Fi wireless network, an USB port, a Bluetooth™, cellular network, a combination thereof, and/or the like.

Cloud-computing platform 145 generally refers to a group of networked computing resources (e.g., data storage, computing power, network resources, software resources) made available without active management by users. In some implementations, cloud-computing platform 145 represents a family of services hosted on one isolated server, multiple isolated servers, or on distributed servers that virtually appear to users to be a single server. Cloud-computing platform 145 may be isolated or divided onto isolated different servers to facilitate the isolation, organization, and management of diverse families of functions that may be accessed by some authorized parties but not others.

In some implementations, cloud-computing platform 145 includes a management system 148 stored in non-transitory computer-readable media in communication with one or more processors. Management system 148 may provide one or more user interfaces through which users may interact with the cloud-computing system 145. The one or more user interfaces may be accessed via user device 140 to, for example, remotely access the device user interface of IT device 101 and any IT device attached thereto. User device 140 and/or IT device 101 may connect to cloud-computing platform 145 via the Internet or other communication network, and may request access to one or more of the computing resources managed by cloud-computing platform 145. User device 140 and/or IT device 101 may include web browser capabilities configured to communicate with the management system 148 via the cloud-computing platform 145 or otherwise through networks, which comprises any public network such as the Internet or World Wide Web or any public or private network as may be developed in the future.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein are implemented as computer-readable program code tangibly embodied in one or more non-transitory computer-readable media 104. In particular, the present techniques may be implemented by Hypertext Transfer Protocol (HTTP) web server 110, cloud access agent 111 and remote access agent 112 stored in one or more non-transitory computer-readable media 104 of IT device 101. The present techniques may also be implemented by management system 148 stored in cloud-computing platform 145 and/or web browser 142 stored in user device 140.

Figure 2:
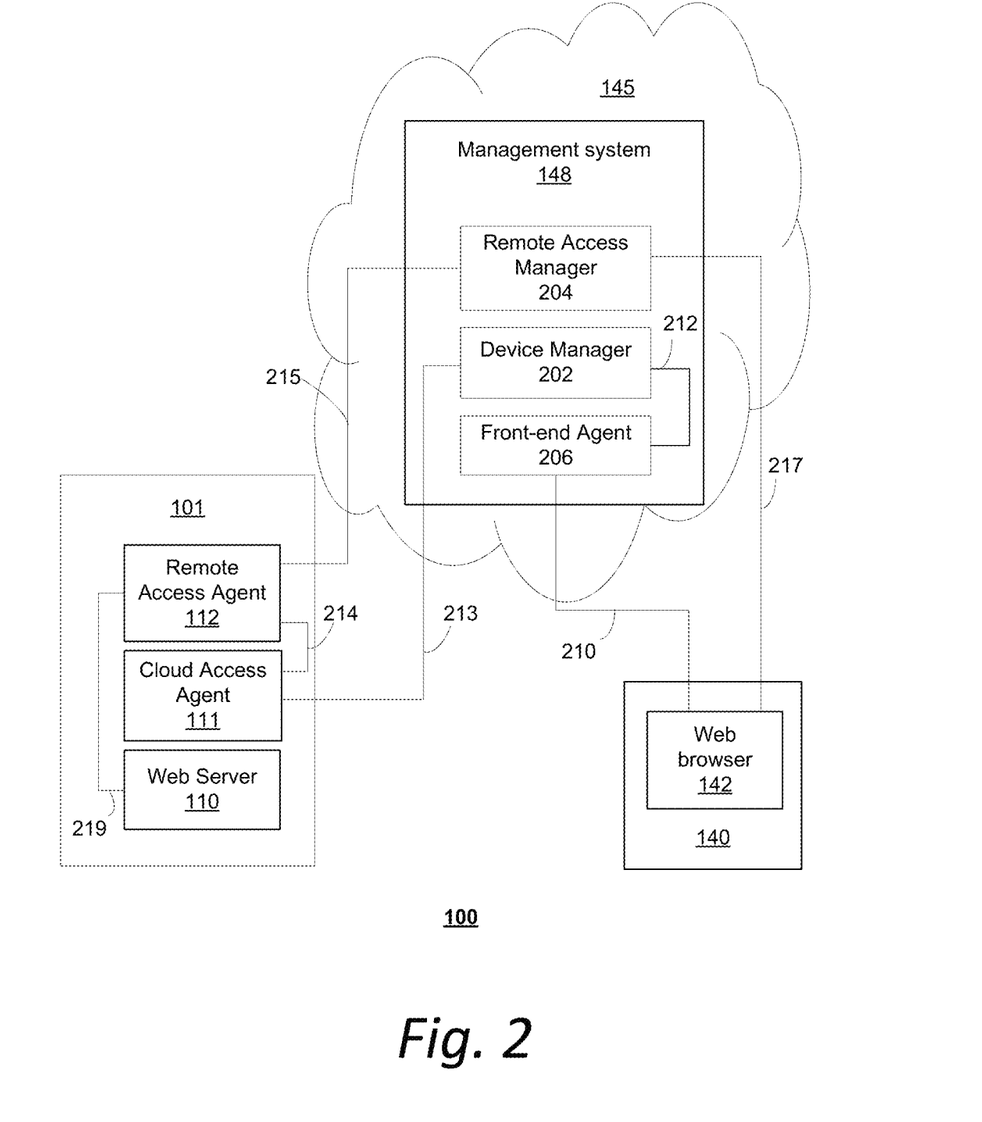
FIG. 2 shows another illustration of an exemplary cloud-based communication system.

FIG. 2 shows another illustration of the exemplary cloud-based communication system 100. The cloud-based communication system 100 includes at least one IT device 101 and a user device 140 communicatively coupled to a cloud-computing platform 145. Although only one IT device 101 and user device 140 are shown, system 100 may include multiple IT devices 101 and multiple user devices 140. Each of the IT devices 101 includes a remote access agent 112 for enabling remote access by user device 140. Such remote access is advantageously enabled without opening any special ports in a firewall at the IT device 101. To be available for operations, IT device 101 may first be enrolled with the cloud-computing platform 145. The enrollment process is described in, for example, application Ser. No. 16/891,012, filed Jun. 2, 2020, entitled "Cloud-based communication system", which is herein incorporated by reference.

In some implementations, management system 148 includes a device manager 202, a remote access manager 204 and a front-end agent 206. Device manager 202 serves to exchange commands and secure channels for communication with cloud access agent 111 in IT device 101. Remote access manager 204 serves to communicate the device user interface from the IT device 101 to the corresponding web browser 142 of the requesting user device 140. User interface events and requests from the web browser 142 may also be communicated to the IT device 101 via the remote access manager 204. Front-end agent 206 may serve to generate the cloud user interface for the cloud-computing platform 145 that is accessible via the web browser 142 on user device 140.

Cloud-computing platform 145 may communicate with IT device 101 over one or more independent secure channels. In some implementations, the secure channels include independent first secure channel 213 and second secure channel 215. First secure channel 213 may serve as the main management channel for communicating data between cloud access agent 111 and device manager 202, while second secure channel 215 may serve as an on-demand remote access channel for communicating data between remote access agent 112 and remote access manager 204. Secure channel 213 may be established once the IT device 101 initializes and may stay connected to device manager 202. Second secure channel 215 may be established on-demand, in response to receiving a request via secure channel 213 from user device 140.

The first and second secure channels (213 and 215) may be secured by mutual authentication using first and second temporary trust certificates respectively. Both first and second trust certificates may be independent and different. Alternatively, first and second trust certificates may be the same. Mutual authentication is a two-way authentication process in which both the IT device 101 and the cloud-computing platform 145 authenticate each other using a trust certificate, as described in, for example, application Ser. No. 16/891,012, filed Jun. 2, 2020, entitled "Cloud-based communication system". The first trust certificate for secure channel 213 may be generated and validated (or signed) with authentication information stored in the hardware cryptographic module of IT device 101. The authentication information provides unique identification of the IT device. The authentication information may include a unique IT device identifier and a hash of a public hardware-based key. The second trust certificate for second secure channel 215 may be generated using the first secure channel 213. For performance reasons, the second trust certificate may be validated using a software cryptographic module, instead of a hardware cryptographic module.

IT device 101 may further use a secure message queue protocol channel (e.g., Message Queuing Telemetry Transport or MQTT) for communication. All communications initiated by the IT device 101 may employ a standard application-layer protocol (e.g., hypertext transfer protocol or HTTP, Hypertext Transfer Protocol Secure or HTTPS) for transmitting hypermedia documents, such as Hypertext Markup Language (HTML) files. Advantageously, no special firewall port needs to be opened to enable secure communications between IT device 101 and cloud-computing platform 145.

Figure 3:
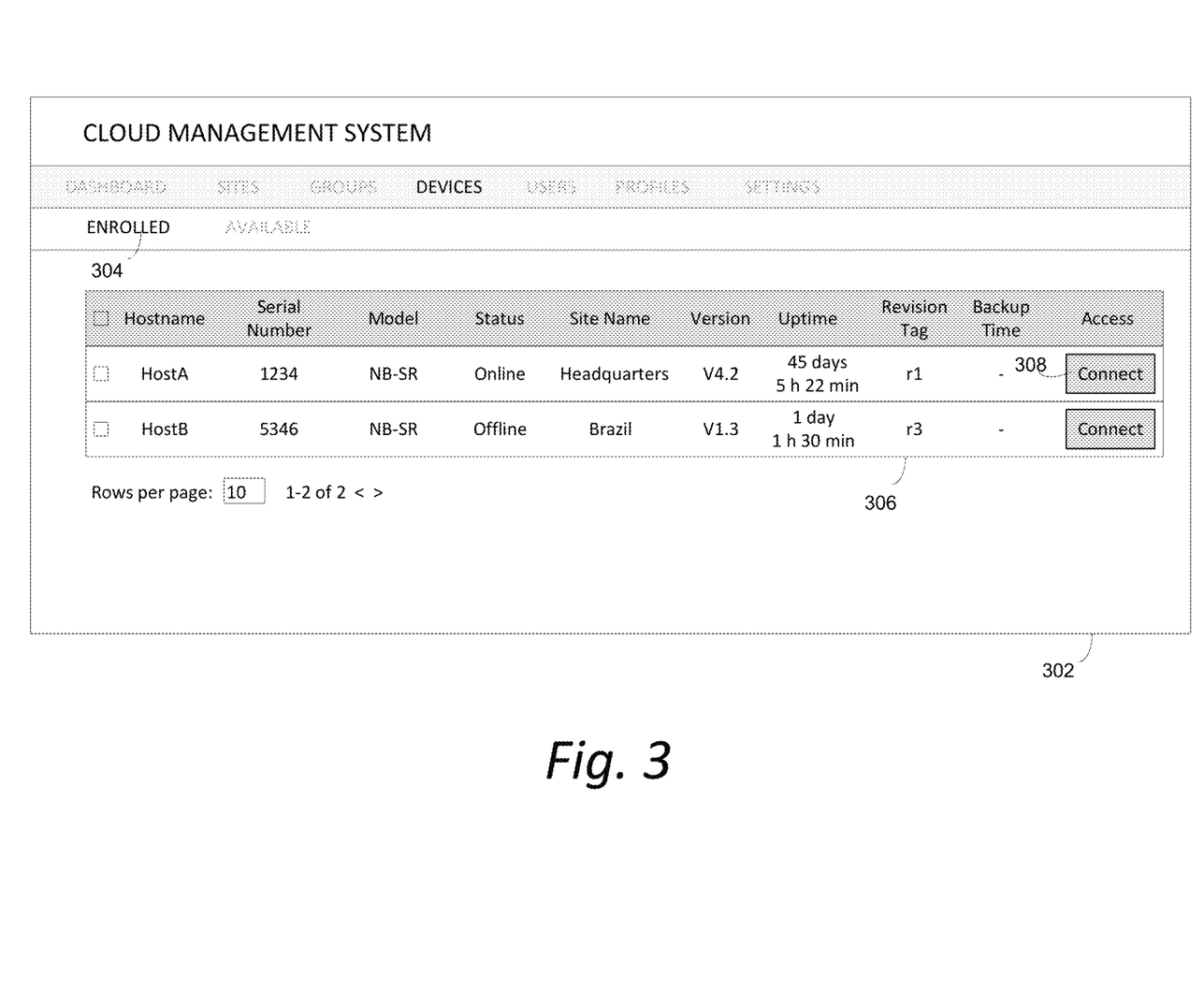
FIG. 3 shows an exemplary cloud user interface screen.

A user may log into the cloud-based computing platform 145 by providing user authentication information (e.g., user name, password) via a cloud user interface accessed via web browser 142. Upon successful user authentication, a cloud session may be started with the cloud-computing platform 145. FIG. 3 shows an exemplary cloud user interface screen 302 presented at web browser 142 during the cloud session. The cloud user interface screen 302 may be generated in response to a message provided by front-end agent 206 of cloud-based computing platform 145. The cloud user interface screen 302 may present a list 306 of one or more enrolled IT devices when the selectable text "Enrolled" 304 is selected. Each row of the list 306 displays information about an IT device, including but not limited to, its hostname, serial number, model, status, site name, version, uptime, revision tag, backup time, or a combination thereof. A selectable user interface element (e.g., "Connect" button) 308 enables the user to select the IT device 101 whose device user interface the user wants to remotely access. The user may select the user interface element 308 to view the local device user interface of the IT device 101.

Returning to FIG. 2, web browser 142 sends a request for the device user interface over connection 210 to front-end agent 206 in response to the user selecting, for example, user interface element 308 on the cloud user interface screen 302, as previously described. The front-end agent 206 sends the request over connection 212 to device manager 202. Device manager 202 may then send the request over first secure channel 213 to cloud access agent 111 in the IT device 101. First secure channel 213 may be a secure channel previously established by mutual authentication using a trust certificate, as previously described.

In response to the request received from device manager 202 over first secure channel 213, cloud access agent 111 communicates with remote access agent 112 in IT device 101 over connection 214. Remote access agent 112 communicates over connection 219 with the local device user interface using the web server 110 implemented in the IT device 101. Web server 110 is implemented in the IT device 101 to fulfil client requests on the World Wide Web by storing, retrieving, processing and delivering web pages to clients. The web pages present the local device user interface of the IT device 101, and may include hypertext markup language (HTML) or Web Socket (WSS) files with, for example, text, images, style sheets, scripts, terminal interface, graphical user interface or a combination thereof embedded within. Each web page may be accessed with a uniform resource locator (URL) unique to the IT device 101. Web server 110 may be, for example, a hypertext transfer protocol (HTTP) server. Web server 110 forwards the device user interface over connection 219 to the remote access agent 112 in response to the request.

Remote access agent 112 may communicate a session identification token to the cloud access agent 111 via connection 214. Remote access agent 112 may also communicate the session identification token along with the device user interface via second secure channel 215 to remote access manager 204 in cloud-computing platform 145. The session identification token is a piece of data that is used in network communications that uniquely identifies the session associated with the device user interface. Cloud access agent 111 may communicate the session identification token to device manager 202 via first secure channel 213. The device manager 202 may then communicate the session identification token to front-end agent 206 via connection 212, which may send the session identification token via connection 210 to web browser 142 on user device 140.

Second secure channel 215 may be established using mutual authentication with a second trust certificate, as previously described. The second trust certificate may be the same as that used for establishing first secure channel 213 or it may be a new trust certificate generated using the first secure channel 213. The securing of connection 215 may be initiated on demand by remote access agent 112 in IT device 101. Connection 215 may be a full-duplex communication channel, such as WebSocket. Additionally, data transfer via connection 215 may be implemented using one or more compression techniques (e.g., Deflate) so as to ensure efficiency in the cost of external link usage by the IT device 101.

Front-end agent 206 may update and communicate the cloud user interface over connection 210. For example, the cloud user interface may show the updated access status (e.g., connected) of the IT device 101. The user may then view the updated cloud user interface using web browser 142. As another example, web browser 142 may also receive the session identification token for the device user interface of IT device 101 in response to selecting the user interface element (e.g., "Connect" button 308) associated with the IT device 101 that the user wants to remotely access. User web requests (e.g., get, post, session identification token) from web browser 142 for the device user interface of IT device 101 may be redirected over connection 217 to remote access manager 204 for that session. Remote access manager 204 may in turn look up the session identification token and associate with the connection 215 and forward the web requests to remote access agent 112 in the IT device 101.

Remote access agent 112 may communicate the web requests over connection 219 to the web server 110. Web server 110 forwards the updated device user interface over connection 219 to the remote access agent 112 in response to the web request. The remote access agent 112 may then forward the updated device user interface to remote access manager 204 over connection 215. Remote access manager 204 then forwards the updated device user interface over connection 217 to web browser 142 in the user device 140 for presentation. In some implementations, a protocol that serializes structured data into a compact format is used to facilitate efficient communication between remote access agent 112 and remote access manager 204. The user may log-in to the IT device 101 remotely by providing user authentication information (e.g., user name, password) via the device user interface, thereby starting a secure device session with the IT device 101. This process ensures that the user at web browser 142 may only access the web server 110 of the IT device 101 after successful authentication, while preserving the security of the cloud-based communication system 100. The device session may be monitored independently from the cloud session.

The remote access agent 112, remote access manager 204 and front-end agent 206 may implement session timeout for lack of activity or user-initiated shutdown. Different session timeouts may be provided for closing different connections or sessions opened by the user. For example, a first timeout (e.g., 5 minutes) may be implemented for the cloud session over connection 210 for exchanges (e.g., cloud user interface) between Web browser 142 and front-end agent 206. A second timeout (e.g., 30 minutes) may be implemented for the device session over connection 217 for exchanges (e.g., device user interface) between Web browser 142 and IT device 101 via remote access manager 204. The cloud and device sessions may be tracked independently. This enables the user to continue to remotely access the device user interface of the IT device 101 in the device session even after the cloud session with the front-end agent 206 has timed-out or is otherwise terminated.

Figure 4:
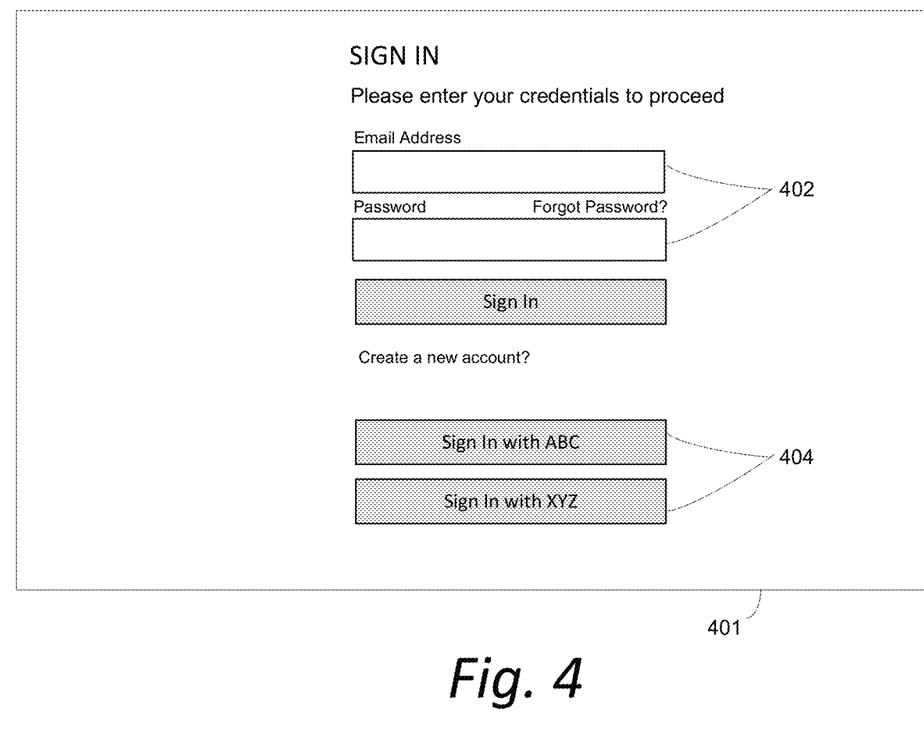
FIG. 4 shows an exemplary device user interface screen.

FIG. 4 shows an exemplary device user interface screen 401 of the IT device 101. The device user interface screen 401 may be displayed in web browser 142 of user device 140. The device user interface screen 401 may present, for example, user interface elements (e.g., text boxes, buttons) 402 for entering user credentials (e.g., e-mail, password). The device user interface screen 401 may also allow other types of sign-in options 404 for a single sign-on (SSO) using other applications. Other types of information may also be displayed. For example, upon successful user authentication, the device user interface screen 401 may display other user interface elements that enable the user to configure and/or manage the IT device 101.

Figure 5:
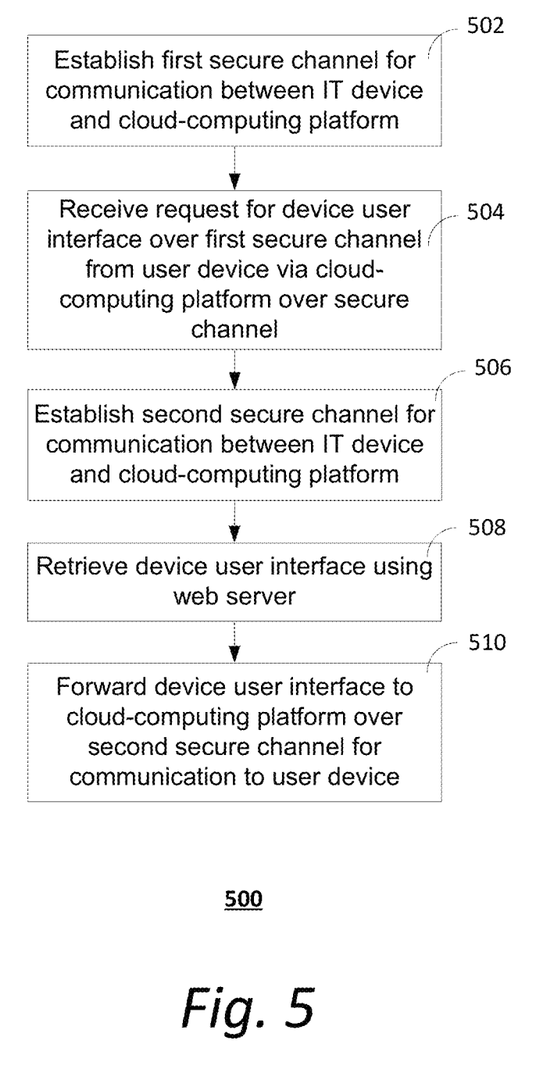
FIG. 5 illustrates an exemplary method of remotely accessing a device user interface from an IT device.

FIG. 5 illustrates an exemplary method 500 of remotely accessing a device user interface from IT device 101. It should be understood that the steps of the method 500 may be performed in the order shown or a different order. Additional, different, or fewer steps may also be provided. Further, the method 500 may be implemented with the system 100 of FIGS. 1 and 2, a different system, or a combination thereof.

At 502, cloud access agent 111 establishes a first secure channel 213 for communication between IT device 101 and cloud-computing platform 145. The first secure channel 213 may be established by mutual authentication using a trust certificate. The trust certificate may be generated and validated (or signed) with authentication information previously stored in the IT device 101. The authentication information may include an IT device identifier unique to the IT device 101, as well as a hash of a public hardware-based key.

At 504, cloud access agent 111 receives a request for its device user interface over the first secure channel 213. The request may have been first initiated by web browser 142 at user device 140 when the user selects a user interface element (e.g., "Connect" button) on the cloud user interface. Front end agent 206 in the cloud-computing platform 145 forwards the request to device manager 202, which then sends the request to cloud access agent 111 in IT device 101 over the first secure channel 213. Additionally, cloud access agent 111 communicates the request to remote access agent 112 in IT device 101.

At 506, remote access agent 112 establishes a second secure channel 215 for communication between the IT device 101 and cloud-computing platform 145. Second secure channel 215 may be established using mutual authentication with a trust certificate. The trust certificate may be the same as that used for first secure channel 213, or it may be a new trust certificate generated using the secure first secure channel 213. The establishment of second secure channel 215 may be initiated on demand by remote access agent 112 in IT device 101. Remote access agent 112 may establish the second secure channel 215 in response to the request for the device user interface sent by the user device 140.

At 508, remote access agent 112 retrieves the device user interface using web server 110. Web server 110 is implemented in the IT device 101 to store, retrieve, process and deliver web pages that present the local device user interface of the IT device 101.

At 510, remote access agent 112 forwards the device user interface over second secure channel 215 to cloud-computing platform 145 for communication to the requesting user device 140. The device user interface may then be presented in web browser 142 of user device 140.

Although the subject matter has been described in language specific to structural features and/or methodological acts, it is to be understood that the subject matter defined in appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more." References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e., hardware with a biological element) or a combination thereof, all of which are behaviorally equivalent. For example, modules may be implemented using computer hardware in combination with software routine(s) written in a computer language (Java, HTML, XML, PHP, Python, ActionScript, JavaScript, Ruby, Prolog, SQL, VBScript, Visual Basic, Perl, C, C++, Objective-C or the like). Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs), field programmable gate arrays (FPGAs), and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above-mentioned technologies may be used in combination to achieve the result of a functional module.

Some embodiments may employ processing hardware. Processing hardware may include one or more processors, computer equipment, embedded systems, machines a combination thereof, and/or the like. The processing hardware may be configured to execute instructions. The instructions may be stored on one or more computer-readable or machine-readable media. According to some embodiments, the machine-readable medium (e.g., automated data medium) may be a medium configured to store data in a machine-readable format that may be accessed by an automated sensing device. Examples of machine-readable media include: magnetic disks, cards, tapes, and drums, flash memory, memory cards, electrically erasable programmable read-only memory (EEPROM), solid state drives, optical disks, barcodes, magnetic ink characters, a combination thereof, and/or the like.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described exemplary embodiments. In particular, it should be noted that, for example purposes, the presently described embodiments are discussed with respect to a data center. However, one skilled in the art will recognize that embodiments may be employed to other collections of IT devices over, for example, a distributed network not confined by a single data center, a small collection of IT devices in an Intranet, combinations thereof, and/or the like.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

What is claimed is:

1. An information technology (IT) device, comprising:
one or more non-transitory computer-readable media for storing computer-readable program code; and
a processor in communication with the one or more non-transitory computer-readable media, the processor being operative with the computer-readable program code to perform operations including
establishing a first secure channel for communication between the IT device and a cloud-computing platform,
in response to a request received over the first secure channel for a device user interface of the IT device, establishing a second secure channel on-demand for communication between the IT device and the cloud-computing platform, and
forwarding the device user interface over the second secure channel to the cloud-computing platform.

2. The IT device of claim 1, wherein the processor is operative with the computer-readable program code to establish the first and second secure channels by performing mutual authentication.

3. The IT device of claim 2 wherein the processor is operative with the computer-readable program code to perform the mutual authentication using a same trust certificate for the first and second secure channels.

4. The IT device of claim 2 wherein the processor is operative with the computer-readable program code to perform the mutual authentication using different trust certificates for the first and second secure channels.

5. The IT device of claim 2 wherein the processor is operative with the computer-readable program code to generate and validate one or more trust certificates for the mutual authentication with authentication information stored in the IT device.

6. The IT device of claim 5 wherein the authentication information comprises a unique IT device identifier and a hash of a public hardware-based key.

7. The IT device of claim 1 wherein the processor is operative with the computer-readable program code to retrieve the device user interface using a web server implemented in the IT device.

8. The IT device of claim 1 wherein the second secure channel comprises a full-duplex communication channel.

9. A method for cloud-based communication, comprising:
receiving, by a cloud-computing platform, from a user device a request for a device user interface of an information technology (IT) device;
sending, by the cloud-computing platform, over a first secure channel the request for the device user interface to the IT device;
in response to the request for the device user interface, establishing a second secure channel on-demand for communication between the IT device and the cloud-computing platform;
receiving, by the cloud-computing platform, over the second secure channel the device user interface from the IT device; and
sending, by the cloud-computing platform, the device user interface to the user device for presentation.

10. The method of claim 9 further comprises starting a cloud session between the user device and the cloud-computing platform upon a first successful user authentication via a cloud user interface.

11. The method of claim 10 further comprises starting a device session between the user device and the IT device upon a second successful user authentication via the device user interface.

12. The method of claim 11 further comprises monitoring the device session independently from the cloud session.

13. The method of claim 11 further comprises implementing, by the cloud-computing platform, different session timeouts for the device session and the cloud session.

14. The method of claim 9 wherein the request for the device user interface is sent in response to a user selection of an element within a cloud user interface for the cloud-computing platform.

15. The method of claim 9 further comprises establishing the first secure channel using mutual authentication.

16. The method of claim 9 further comprises establishing the second secure channel using mutual authentication.

17. The method of claim 9 further comprises sending, to the user device, a uniform resource locator (URL) that is unique to the IT device for accessing the device user interface.

18. The method of claim 9 further comprises receiving, over the first secure channel, a session identification token that is associated with the device user interface.

19. A cloud-based communication system, comprising:
a cloud-computing platform;
a user device communicatively coupled to the cloud-computing platform; and
at least one information technology (IT) device communicatively coupled to the cloud-computing platform, wherein the at least one IT device receives a request from the user device for a device user interface of the IT device over a first secure channel established between the cloud-computing platform and the at least one IT device, wherein a second secure channel is established on-demand between the cloud-computing platform and the at least one IT device in response to the request from the user device, wherein the IT device sends the device user interface over the second secure channel to the cloud-computing platform for communication to the user device.

20. The cloud-based communication system of claim 19 wherein the first and second secure channels are established by mutual authentication using a trust certificate.

* * * * *